United States Patent
Huang et al.

(10) Patent No.: US 7,207,707 B2
(45) Date of Patent: Apr. 24, 2007

(54) BACK LIGHT MODULE OF LIQUID CRYSTAL DISPLAY DEVICE

(75) Inventors: Hsin-Tao Huang, Shin-Ju (TW); Chun-Chieh Chu, Pan-Chiao (TW)

(73) Assignee: AU Optronics Corporation, Hsin-Chu (TW)

( * ) Notice: Subject to any disclaimer, the term of this patent is extended or adjusted under 35 U.S.C. 154(b) by 83 days.

(21) Appl. No.: 10/833,173

(22) Filed: Apr. 28, 2004

(65) Prior Publication Data

US 2005/0180171 A1 Aug. 18, 2005

(30) Foreign Application Priority Data

Feb. 18, 2004 (TW) .............. 93103982 A

(51) Int. Cl.
*F21V 7/04* (2006.01)
(52) U.S. Cl. .............. 362/614; 362/633; 362/634
(58) Field of Classification Search .............. 362/12, 362/606, 608, 632, 633, 623, 624, 609
See application file for complete search history.

(56) References Cited

U.S. PATENT DOCUMENTS

| 5,836,669 | A | * | 11/1998 | Hed | 362/92 |
| 6,343,868 | B1 | * | 2/2002 | Itoh | 362/609 |
| 6,856,363 | B2 | * | 2/2005 | Kim | 349/65 |
| 2002/0054249 | A1 | * | 5/2002 | Ryu et al. | 349/58 |
| 2003/0198039 | A1 | * | 10/2003 | Jeong et al. | 362/31 |
| 2003/0208764 | A1 | * | 11/2003 | Galipeau et al. | 725/76 |
| 2004/0156183 | A1 | * | 8/2004 | Kim | 362/31 |
| 2004/0170010 | A1 | * | 9/2004 | Ho | 362/31 |

* cited by examiner

*Primary Examiner*—Renee Luebke
*Assistant Examiner*—Evan Dzierzynski
(74) *Attorney, Agent, or Firm*—the Nath Law Group; Jerald L. Meyer; Derek Richmond

(57) ABSTRACT

The back light module of LCD device of the present invention is to use the two ends of reflecting plate to roll up and cover light generating units and reaching the function of lamp reflector. Also, the problem of EMI (electric magnetic interference) can be overcome by covering a shell with an EMI protection function on the roll up ends and/or coating or covering the metal with an EMI protection function on one surface of the reflecting plate.

25 Claims, 5 Drawing Sheets

BACK LIGHT MODULE OF LIQUID CRYSTAL DISPLAY DEVICE

BACKGROUND OF THE INVENTION

1. Field of the Invention

This invention relates to a back light module of LCD device, and more particularly to a back light module of LCD device using a reflecting plate as a lamp reflector to reflect the light generated by light reflecting generating units and using a metallic material installed on a surface of the reflecting plate and/or a coupling elements to overcome the EMI problem.

2. Description of the Prior Art

A traditional back light module of an LCD (liquid crystal display) device generally comprises a support frame, a light guiding plate, a lamp module, a reflecting plate assembled under the bottom of light guiding plate, and various optical films assembled on the upper of the light guiding plate. The various optical films include a diffusing film, a light condensing film, a light enhancement film, a prism film, and so on. The lamp module includes a U-shaped lamp reflector reflecting the light emitted from the lamp into the light guiding plate. Furthermore, the light guiding plate guides the light to the front LCD device.

In the conventional back light module, the lamp is assembled within the U-shaped lamp reflector. Nevertheless, there are commonly matching problems occurred among the U-shaped lamp reflector, the light guiding plate, and the reflecting plate, in practice. These matching problems always cause the effects of dark region, light leakage, dark stripe, and wrinkling in some areas of the back light module. Moreover, the U-shaped lamp reflector is generally made of metallic materials and harder than the light guiding plate, and therefore the light guiding plate is scraped easily to generate dust during assembly or re-module processing.

In the conventional arts, the lamp module of the back light module is supported by a plastic frame (i.e., support frame) which is fixed by screws in back light module assembly process. However, the plastic frame will deform and oppress the lamp when the assembling screws are turned to tighten them. This causes the lamp bent and dark regions, so the displaying quality will reduce.

Furthermore, the lamp reflector of the lamp module and the reflecting plate compress each other easily, so the wrinkling phenomenon will occur in the reflecting plate.

Besides, the lamp reflector, the light guiding plate, and the reflecting plate are tightly connected with each other. While the LCD device composed of the back light module and the LCD panel processes with shock test, the lamp reflector compresses the light guiding plate and the reflecting plate, and therefore the drop test is failure. Namely, the structure mentioned above results in that toleration for collision or dropping goes down. Therefore, the displaying quality is reduced, and even the LCD penal can not further use due to some external forces under general collisions.

Hence, people familiar with those skills in the art tried to fabricate a back light module without the lamp reflector for LCD device. For example, US Patent No. US2003/0043314A1 discloses a back light module without U-shaped lamp reflector. However, the back light module mentioned above uses circle-shaped lamp, not linear-shaped light generating unit. Moreover, the back light module uses a reflecting plate to cover the lamp for replacing the lamp reflector in the conventional arts. However, the conventional lamp reflector is made of metal to avoid electro-magnetic interference (EMI) problem for eliminating interference in image quality. Accordingly, the LCD device without lamp reflector causes electro-magnetic interference (EMI) problem. Furthermore, the wrinkle of the reflecting plate resulted from temperature variability still exits in the patent.

Besides, U.S. patent application Ser. No. 2002/0021383A1 discloses a structure of back light module. A reflecting plate is banded upward to form an upper plate for avoiding the problems of light leakage and wrinkle. Similarly, this patent application still does not use conventional metal lamp reflector and has the electromagnetic interference.

In accordance with problems mentioned above, the inventor have researched extensively in the back light module of LCD device and then completed the present invention.

SUMMARY OF THE INVENTION

The present invention provides a back light module of LCD device. The back light module comprises a support frame, at least one light generating unit, a light reflecting plate, and a light guiding plate. The support frame has support elements thereon. The light generating unit has coupling elements to engage with the support elements respectively installed on two ends thereof. The light reflecting plate is installed on the support frame for reflecting a light generated by the light generating unit upwards, and two ends of the reflecting plate are bent upward. The light guiding plate is installed on the light reflecting plate for guiding the light. In such case, a metallic material for isolating electro-magnetic interference is installed on a surface of the reflecting plate, a surface of the coupling elements, or the combination thereof.

The present invention also provides a back light module of LCD device using a different assembling design. The back light module comprises a support frame, a light reflecting plate, a light guiding plate, and at least one light generating unit. The light reflecting plate is installed on the support frame and two ends of the reflecting plate are bent upward. The light guiding plate is installed on the reflecting plate, two side of the light guiding plate have an indentation respectively, and support elements are formed in the indentations. The light generating unit is installed in corresponding indentation and has two coupling elements to engage with the support elements respectively installed on two ends of the light generating unit. A light generated by the light generating unit is reflected upwards, and is guided by the light guiding plate. In such case, a metallic material for isolating electro-magnetic interference is installed on a surface of the reflecting plate, a surface of the coupling elements, or the combination thereof.

The present invention further provides a back light module of LCD device using another different assembling design. The back light module comprises a support frame, at least one light generating unit, a light reflecting plate, and a light guiding plate. The light generating unit has two coupling elements respectively installed on two ends thereof. The light reflecting plate is installed between the light generating unit and the support frame for reflecting a light generated by the light generating unit upwards. Two ends of the reflecting plate are bent upward. The light guiding plate is installed on the reflecting plate for guiding light. In such case, a metallic material for isolating electro-magnetic interference is installed on a surface of the reflecting plate, a surface of the coupling elements, or the combination thereof.

The back light modules according to the present invention can avoid the possibility of assembly interference among the lamp, the light reflecting plate, and the light guiding, and overcome the problems of light leakage, dark stripe, wrinkling, and EMI.

The back light modules according to the present invention employ the light reflecting plate with two ends bending upward to cover the light generating unit for replacing the lamp cover in the conventional arts. Furthermore, the EMI problem can be overcome by coating or covering the metallic material on the surface of the reflecting surface and/or the coupling elements.

Besides, the reflecting plate can be divided into two portions to cover the light generating unit. For example, the light generating unit is covered by an L-shaped upper cover and a bottom reflecting plate of the reflecting plate to reduce the influence for the light guiding plate, the light reflecting plate, resulted from the heat generated by the light generating unit. The L-shaped upper cover and the bottom of the reflecting plate can be fixed by the support elements and the coupling elements using as tongue-and-groove joint. Moreover, two sides of the bottom reflecting plate can be bent upward to overlap the L-shaped upper cover for eliminating light leakage. The wrinkling problem of the reflecting plate due to the environment temperature variability resulted from the heating of the light generating plate heating can be reduced by this design.

In another embodiment of the back light module of LCD device according to the present invention, the light generating unit is installed on one end or two ends of the light guiding plate. The end(s) where the light generating unit is (are) installed extends outward to form support elements for supporting the light generating unit. The reflecting plate below the light guiding plate is bent upwards to cover the light generating unit, and the reflecting plate can function as lamp cover.

Accordingly, the back light module of the present invention does not need the conventional lamp cover, so the winkling problem due to assembly of the lamp module can be avoided. Moreover, the assembly is more simpler and the production cost is reduced because the light generating unit is installed on the support frame or the light guiding plate.

DESCRIPTION OF THE PREFERRED EMBODIMENT

The present invention has been illustrated by reference to the preferred embodiments. However, the embodiments are only used to illustrate the present invention and are not to limit the scope of the present invention.

Figure 1:
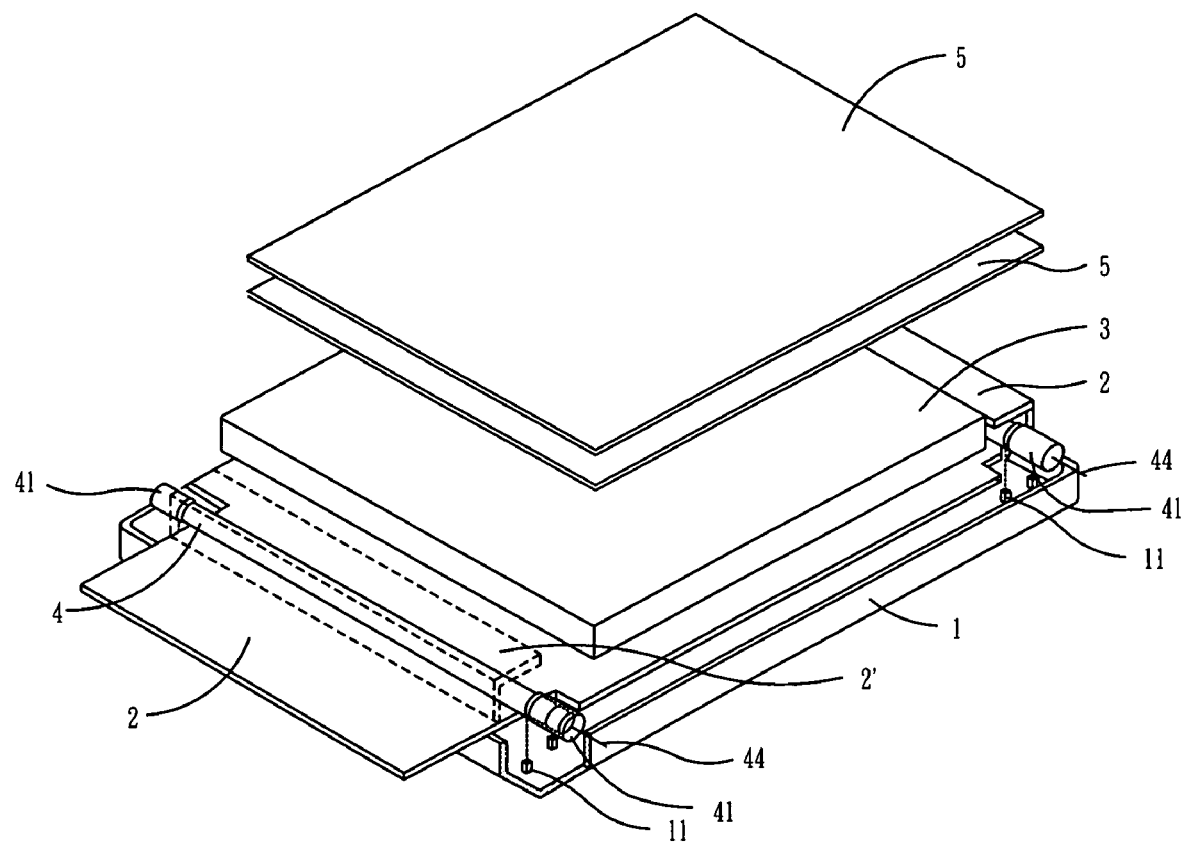
FIG. 1 illustrates a schematic diagram of an embodiment of a back light module of LCD device in the present invention.

FIG. 1 is a schematic diagram of an embodiment of a back light module of LCD device according to the present invention, and illustrates the corresponding relationship between all elements in the back light module before assembling. The back light module comprises a support frame 1, a reflecting plate 2, a light guiding plate 3, light generating units 4, and one or more optical films 5. The reflecting plate 2 reflects a light generated by the light generating units 4 to the light guiding plate 3. The light guiding plate 3 guides the light to the LCD panel (not shown). The light generating units 4 is installed on one or two sides of the support frame 1, and the support elements 11 are formed on the two ends of the support frame 1 for supporting the light generating units 4. In order to clearly express the position of the support elements 11 on the support frame 1, in FIG. 4, one corner of the support frame 1 is cut out to expose the support elements 11. In practice, however, the corner of the support frame 1 has not been cut out. Moreover, coupling elements 41 can be hollowed cylinders to sheathe the ends of the light generating unit 4 therein. In FIG. 1, the left end of the light generating unit 4 placed in the coupling element 41 is draw with dotted line to represent for clearly understanding the component relationship between the coupling elements 41 and light generating unit 4. Coupling elements 41 are installed on the two ends of the light generating unit 4 respectively to make the light generating unit 4 and the support elements 11 engage with each other. Moreover, the coupling elements 41 have a conductive wire 44 to electrically connect with power supply. The two sides of the reflecting plate 2, in correspondent with the position of the light generating unit 4, extend an estimated length, and the extending portions are rolled upward to cover the light generating unit 4 as lampcover. The reflecting plate 2 can be fixed on the support frame 1 and on the light guiding plate 3 by adhesive (e.g., twin adhesive) or tongue-and-groove joint. In FIG. 1, the right side of the reflecting plate 2 displays a finished shape of the reflecting plate 2, the left side displays an un-finished shape of the reflecting plate 2, and the dotted line at the right side represents the curved shape of the reflecting plate 2 for easily understanding the embodiment.

In the embodiment, the electromagnetic interference (EMI) can be eliminated by coating, covering, or pasting with a metallic material (not shown) on the surface(s) of the coupling elements 41 or any one surface of reflecting plate 2. It is preferred to coat, cover, or paste on the bottom surface of the reflecting plate 2 (i.e., the opposite surface to the light guiding plate 3). Therefore, the present invention can eliminate EMI problems. In such case, the metallic material can be any metal capable of isolating EMI, such as Cu, Ni, Al, or the combination thereof. Moreover, the quantity of the light generating unit can be one or many, depending on the desired purpose. In general, there are two light generating units and the two light generating units are respectively on the two sides of the back light module.

Figure 4:
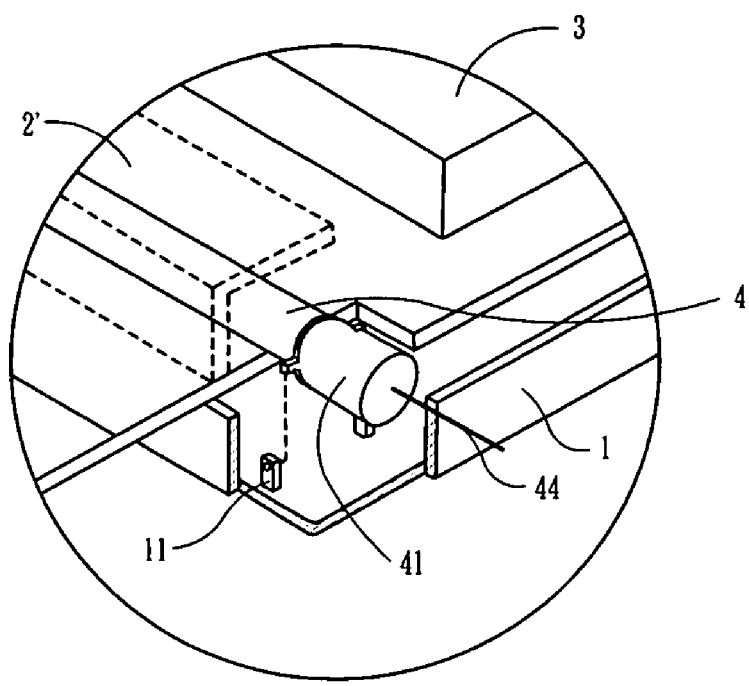
FIG. 4 illustrates a partial schematic diagram of the engaging action for the coupling elements of the light generating unit and the support elements of the support frame in FIG. 1.

FIG. 4 illustrates a partial schematic diagram of the engaging action for the coupling elements 41 of the light generating unit 4 and the support elements 11 of the support frame 1 in FIG. 1.

Figure 7:
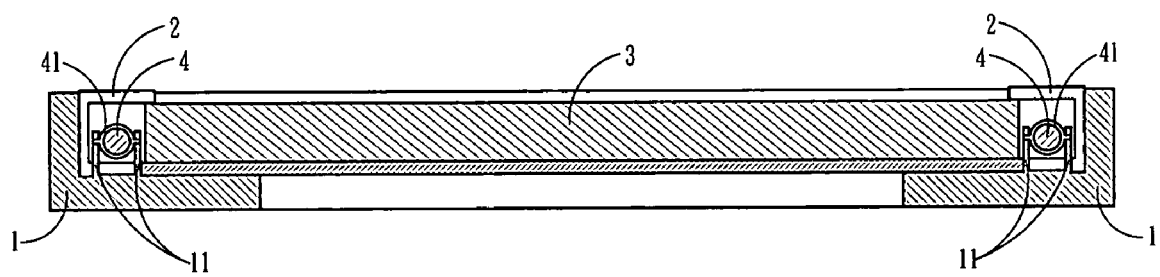
FIG. 7 illustrates a cross-sectional view of the back light module in FIG. 1.

FIG. 7 illustrates a cross-sectional view along a cross-section line connecting with the left and right support elements 11 of the back light module in FIG. 1. However, there are quite many elements in FIG. 1, and the cross-section line is not drawn to succinctly describe the figure for avoiding perplexing to understand the present invention.

In the embodiment, the extending portions of the reflecting plate are curved upwards and covered the light generating unit as lamp cover. As mentioned above, the reflecting plate can be divided into two portions (e.g., an upper cover and a bottom reflecting plate) to cover the light generating units for reducing the heat influence of the light generating units on other devices, such as the reflecting plate. For example, the reflecting plate can be composed of L-shaped upper covers and a bottom reflecting plate. The L-shaped upper covers and the bottom reflecting plate can be fixed by tongue-and-groove joint. Furthermore, the two sides of the bottom reflecting plate can be slightly curved upwards to overlap the L-shaped upper covers for eliminating the problem of light leakage. The wrinkling problem of the reflecting plate due to the surrounding temperature variability resulted from the heating of the light generating unit can be reduced through this design.

Figure 2:
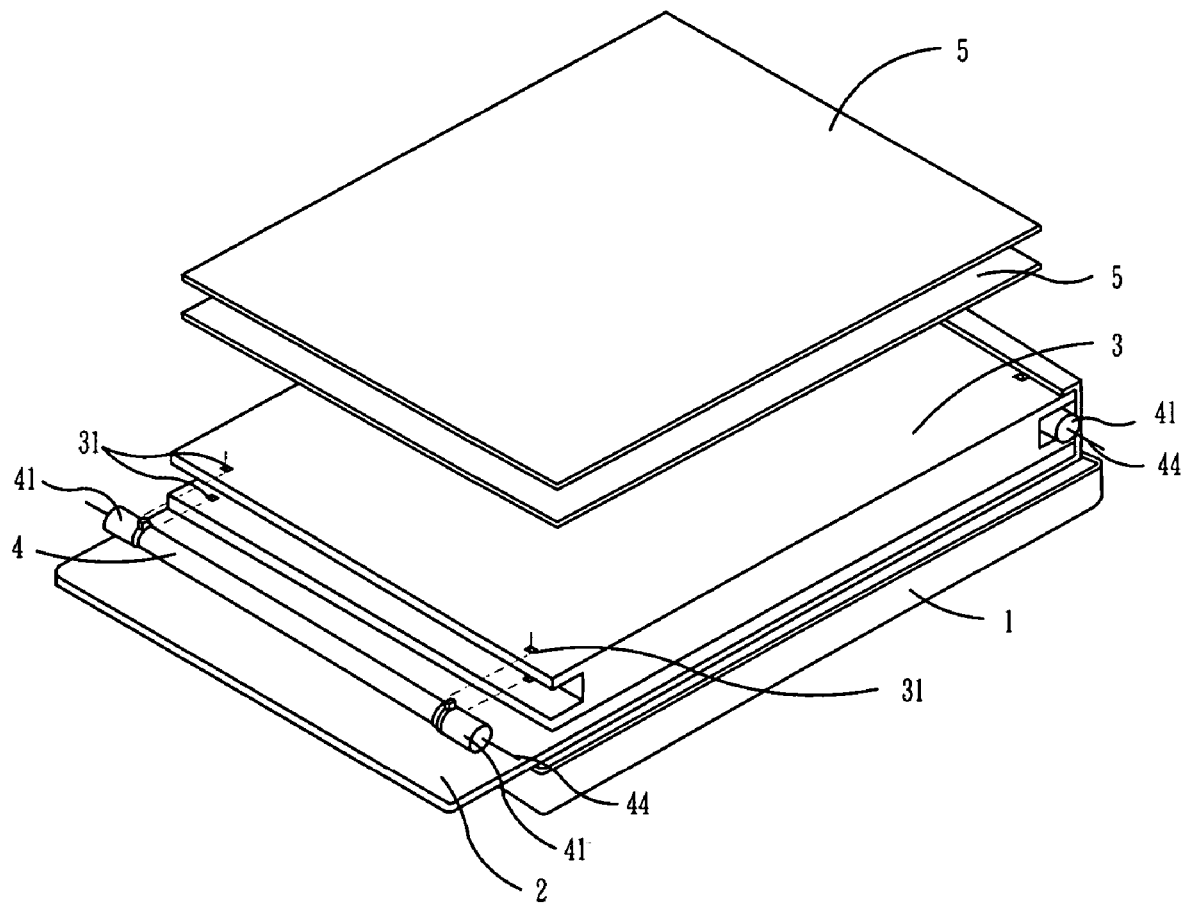
FIG. 2 illustrates a schematic diagram of another embodiment of a back light module of LCD device in the present invention.

Please refer to FIG. 2. FIG. 2 illustrates a schematic diagram of another embodiment of a back light module of LCD device in the present invention. The back light module of LCD device comprises a support frame 1, a reflecting plate 2, a light guiding plate 3, light generating units 4, and one or more optical films 5. The reflecting plate 2 reflects a light generated by the light generating units 4 to the light guiding plate 3. The light guiding plate 3 guides the light to the LCD panel. Two sides of the light guiding plate 3 have indentations formed thereto respectively, and support elements 31 are formed at the two ends of the indentations to support the light generating unit 4. Similarly, coupling elements 41 are installed on the two ends of light generating unit 4 respectively, and the support elements 31 on the light guiding plate 3 are engaged with the coupling elements 41. Moreover, the coupling elements 41 have a conductive wire 44 respectively to electrically connect with power supply. The two sides of the reflecting plate 2 extend an estimated length, and the extending portions are rolled upward to cover the light generating unit 4 as lamp cover. Similarly, for easily understanding the embodiment, the right side of the reflecting plate 2 displays a finished shape of the reflecting plate 2, and the left side displays an un-finished shape of the reflecting plate 2.

In the embodiment, the electro-magnetic interference (EMI) can be eliminated by coating, covering, or pasting with a metallic material (not shown) of isolating EMI on the surface of the coupling element 41 or any one surface of reflecting plate 2. Therefore, the back light module of the present invention can eliminate EMI problems. In such case, the metallic material can be any metal capable of isolating EMI, such as Cu, Ni, Al, or the combination thereof. Moreover, the quantity of the light generating unit can be two or more. Furthermore, indentations are not only formed on the two sides of the light guiding plate, but also on other locations of the light guiding plate for installing light generating units therein. In general, there are two light generating units disposed in the indentations at the two sides of the light guiding plate respectively.

Figure 5:
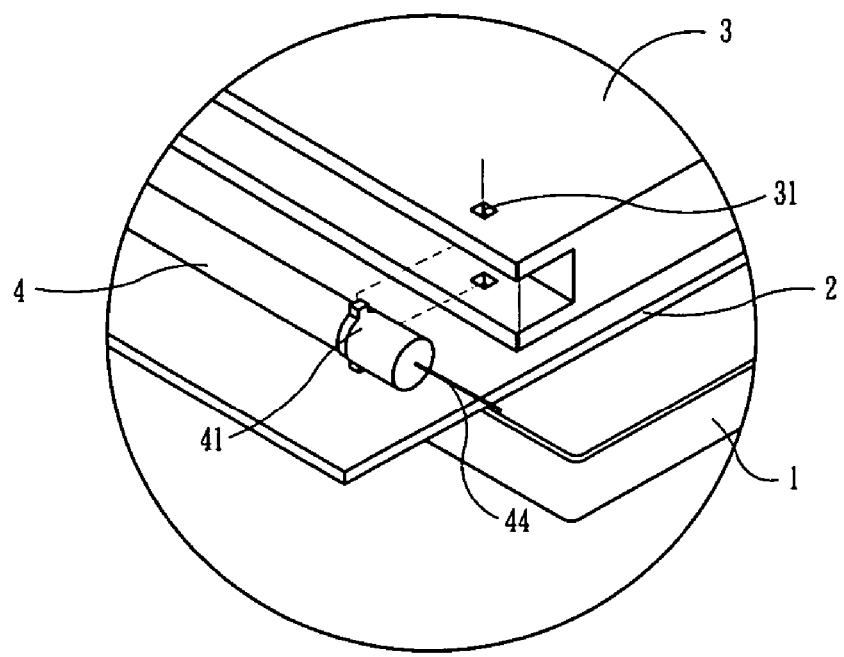
FIG. 5 illustrates a partial schematic diagram of the engaging action for the coupling elements of the light generating unit and the support elements of the light guiding plate in FIG. 2.

FIG. 5 illustrates a partial schematic diagram of the engaging action for the coupling elements 41 of the light generating unit 4 and the support elements 31 of the light guiding plate 3 in FIG. 2.

Figure 8:
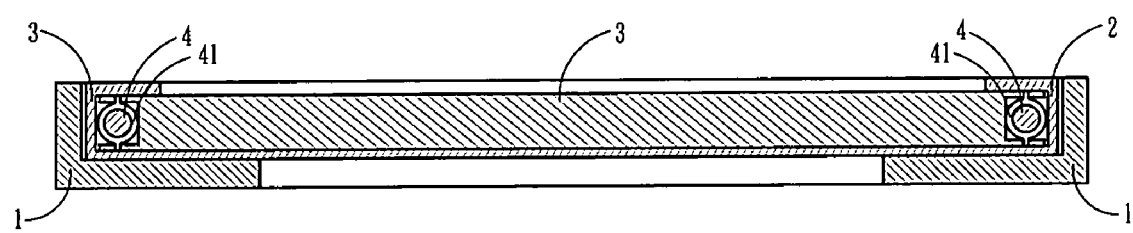
FIG. 8 illustrates a cross-sectional view of the back light module in FIG. 2.

FIG. 8 illustrates a cross-sectional view along a cross-section line connecting with the left and right support elements 31 of the back light module in FIG. 2.

In the embodiment, the extending portions of the reflecting plate are curved upwards and covered the light generating unit as lamp cover. As mentioned above, the reflecting plate can be divided into an L-shaped upper cover and a bottom reflecting plate to cover the light generating units for reducing the heat influence of the light generating units. The two sides of the bottom reflecting plate can be slightly curved upwards to overlap the L-shaped upper covers for eliminating the problem of light leakage. Moreover, the wrinkling problem of the reflecting plate due to the surrounding temperature variability resulted from the heating of the light generating unit can be reduced through this design.

Figure 3:
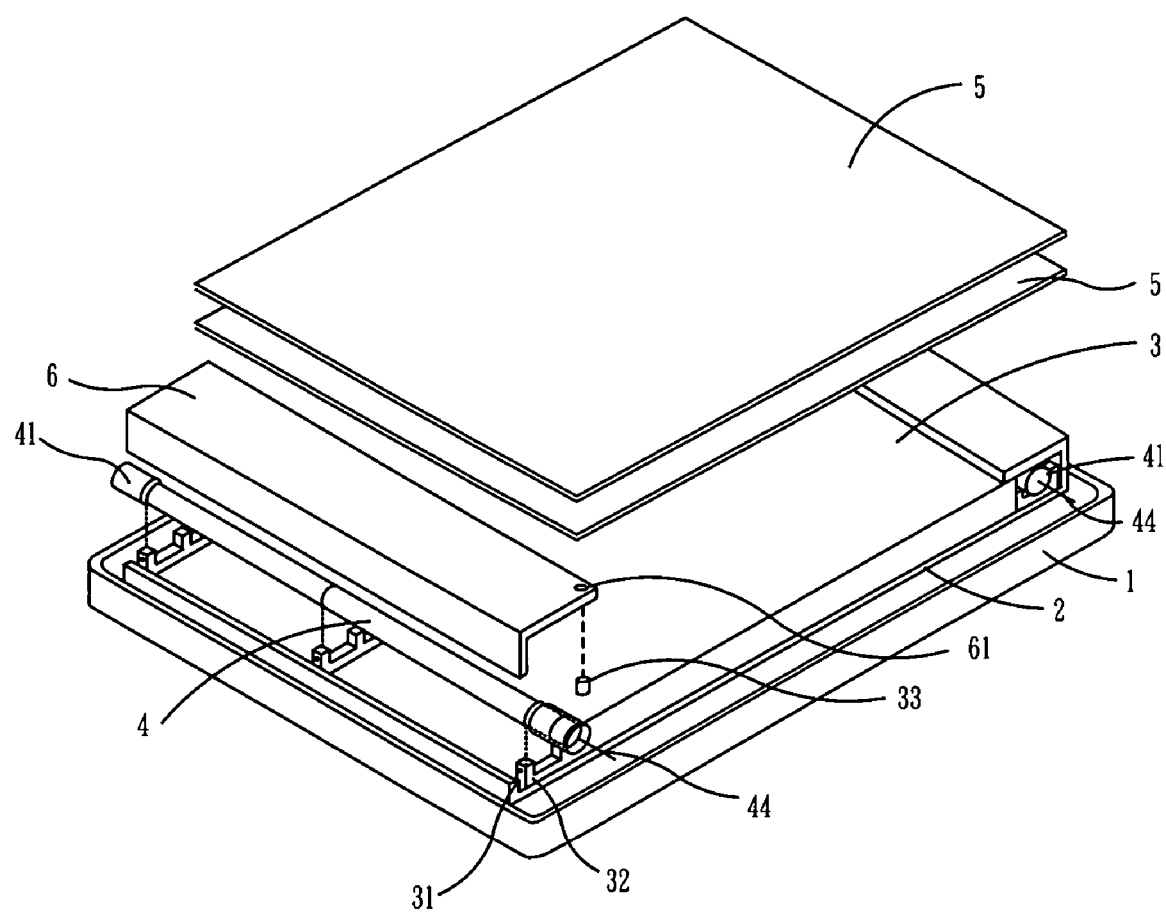
FIG. 3 illustrates a schematic diagram of a further embodiment of a back light module of LCD device in the present invention.

Please refer to FIG. 3. FIG. 3 illustrates a schematic diagram of a further embodiment of a back light module of LCD device in the present invention. The back light module also comprises a support frame 1, a reflecting plate 2, a light guiding plate 3, light generating units 4, and one or more optical films 5. The support frame 1 supports all elements of the back light module. The reflecting plate 2 reflects a light generated by the light generating units 4 to the light guiding plate 3. The light guiding plate 3 guides the light to the LCD panel (not shown).

Figure 6:
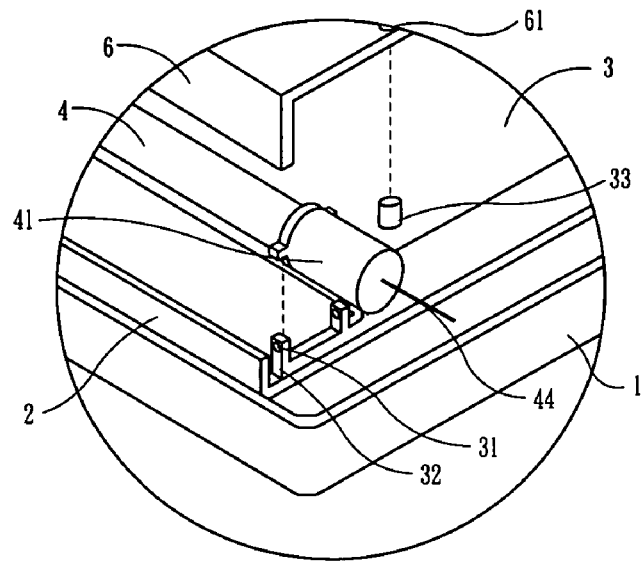
FIG. 6 illustrates a partial schematic diagram of the engaging action for the coupling elements of the light generating unit and the support elements of the support stand in FIG. 3.

The light generating unit 4 is installed on one or two sides of the support frame 1, and the support elements 31 are formed on the two ends of the side(s). Two sides of the light guiding plate 3 have support stands 32 that have support elements 31 thereon for supporting the light generating unit 4. Coupling elements 41 are installed on the two ends of light generating unit 4 respectively, and support elements 31 on the support stands 32 are engaged with the coupling elements 41. Moreover, the coupling elements 41 have a conductive wire 44 respectively to electrically connect with power supply. The two sides of the reflecting plate 2 extend an estimated length, and the extending portions are rolled upward, and an L-shaped upper cover covers the light generating unit 4. The L-shaped upper cover can be fixed by adhesive (e.g., twin adhesive) or tongue-and-groove joint. As shown in FIG.6, engaging elements 61 of the L-shaped upper cover and engaging element 33 of the light guiding plate 3 engage to fix the L-shaped upper cover for achieving the function of lamp cover.

In the embodiment, the engaging elements can be a protruding and a hollow to provide inter-engaged.

In such case, the electro-magnetic interference (EMI) can be eliminated by coating, covering, or pasting with a metallic material (not shown) on the surface(s) of the coupling elements 41 or any one surface of reflecting plate 2. Therefore, the back light module of the present invention can eliminate EMI problems. The metallic material can be any metal capable of isolating EMI, such as Cu, Ni, Al, or the combination thereof. Moreover, the quantity of the light generating unit can be one or many, depending on the desired purpose. In general, there are two light generating units respectively on the two sides of the back light module.

FIG. 6 illustrates a partial schematic diagram of the engaging action for the coupling elements 41 of the light generating unit 4 and the support element 31 of the support stand 32 in FIG. 3.

In the second embodiment mentioned above, the light generating unit is installed in light guiding plate by forming an indentation in one side of the light guiding plate to contain the light generating unit. Furthermore, two ends of the indentation have the engaging element corresponding to the coupling element (e.g., silica gel) to fix the light generating unit. In practice, one or many protruding may be formed in the indentation to fix the light generating unit more stably. The function of the protruding is similar to the function of O-ring that is used in the lamp of lamp module in the conventional arts. However, the protruding is unnecessary if the light generating unit comprises the O-ring thereon.

In the three embodiments mentioned above, the bending status of the two sides of the reflecting plate is not only right-angled, as shown in figures, but also is curviform. The light generating units can be placed in the bent two side of the reflecting plate or in the indentations of the light guiding plate.

In the present invention, the support frame having support elements can be manufactured by integrated method like plastic mold injection, so it is very simple for manufacturing. In order to make the reflecting plate easily bend, the stitching line can be formed on the reflecting plate.

Moreover, in accordance with the back light module of the present invention, the reflecting plate generally is made of PET (Poly(ethylene terephthalate)), and a light reflecting layer (e.g., $TiO_2$, Ag) is coated thereon. It is preferred that the light reflecting layer is $TiO_2$ for avoiding the phenomenon of color density shift resulted from absorbing partial visible light.

The back module of LCD device according to the present invention, the optical films is the conventional optical films for LCD device, comprising a diffusing film, a light condensing film, a light enhancement film, a prism film, and so on.

In accordance with the embodiments of the present invention mentioned above, the problems of light leakage, dark stripe, wrinkling, and EMI now can all be eliminated.

What is claimed is:

1. A back light module of LCD device, the device constructed by:
   forming a support frame having support elements thereon;
   installing at least two light generating units having two coupling elements disposed thereon so as to engage with each of said support elements respectively;
   installing a light reflecting plate installed on said support frame for reflecting light generated by said light generating unit upwards, said reflecting plate having two upward bent ends formed integrally with said light reflecting plate; and
   a light guiding plate installed on said reflecting plate for guiding the light, the light guiding plate received by said light reflecting plate;
   wherein a metallic material for isolating electro-magnetic interference is coated on a surface of said reflecting plate, a surface of said coupling elements, or the combination thereof.

2. The back light module according to claim 1, wherein material of said coupling elements is silica gel.

3. The back light module according to claim 1, wherein said metallic material for isolating electro-magnetic interference is Cu, Ni, Al, or the combination thereof.

4. The back light module according to claim 1, wherein said reflecting plate is divided into two portions for covering said light generating unit.

5. The back light module according to claim 4, wherein said reflecting plate is composed of an upper cover and a bottom reflecting plate.

6. The back light module according to claim 5, wherein said upper cover is L-shaped.

7. The back light module according to claim 5, wherein said bottom reflecting plate has two ends bent upward.

8. A back light module of LCD device, comprising:
   a support frame;
   a light reflecting plate installed on said support frame, and wherein two ends of said reflecting plate are bent upward, the upward bent ends formed integrally with said light reflecting plate;
   a light guiding plate installed on said reflecting plate, two side of said light guiding plate respectively having an indentation, and wherein support elements are formed in said indentations, the light guiding plate received by said light reflecting plate; and
   at least a pair of light generating units installed in corresponding said indentation, wherein the light generated by said light generating units upwards is reflected upwards by said light reflecting plate and then guided by said light guiding plate towards a LCD panel, and said light generating units have two coupling elements disposed thereon to engage with said support elements respectively installed on two ends thereof;
   wherein a metallic material for isolating electro-magnetic interference is coated on a surface of said reflecting plate, a surface of said coupling elements, or the combination thereof.

9. The back light module of LCD penal according to claim 8, wherein material of said coupling elements are silica gel.

10. The back light module according to claim 8, wherein said metallic material is Cu, Ni, Al, or the combination thereof.

11. The back light module according to claim 8, wherein said reflecting plate is composed of an upper cover and a bottom reflecting plate.

12. The back light module according to claim 11, wherein said bottom reflecting plate has two ends bent upward.

13. The back light module according to claim 11, wherein said upper cover is L-shaped.

14. A back light module of LCD device, comprising:
   a support frame;
   at least a pair of light generating units having two coupling elements respectively installed thereon;
   a light reflecting plate installed between at least one said light generating unit and said support frame for reflecting light generated by said light generating unit upwards, and wherein two ends of said reflecting plate are bent upward, the upward bent ends formed integrally with said light reflecting plate; and
   a light guiding plate installed on said reflecting plate for guiding the light, and said light guiding plate having support elements that engage with said coupling elements to fix said light generating unit on said support frame, said light guiding plate received by said light reflecting plate;
   wherein a metallic material for isolating electro-magnetic interference is coated on a surface of said reflecting plate, a surface of said coupling elements, or the combination thereof.

15. The back light module according to claim 14, wherein material of said coupling elements are silica gel.

16. The back light module according to claim 14, wherein said reflecting plate is composed of an upper cover and a bottom reflecting plate.

17. The back light module according to claim 16, wherein said bottom reflecting plate has two ends bent upward.

18. The back light module according to claim 16, wherein said upper cover is L-shaped.

19. A back light module of LCD device, comprising:
a support frame;
at least one light generating unit disposed over said support frame, having two coupling elements disposed thereon;
a light guiding plate installed over said support frame and adjacent to said light generating units for guiding the light; and
a light reflecting plate disposed between said light guiding plate and said support frame, having at least one extending portion bent upward to cover said light generating unit.

20. The backlight module of claim 19, wherein said coupling elements respectively install at two ends of said light generating unit.

21. The backlight module of claim 19, wherein said light reflecting plate further comprises a plurality of support elements engaging to fix said light generating unit.

22. The backlight module of claim 20, wherein said support frame further comprises a plurality of support elements engaging to fix said light generating unit.

23. The backlight module of claim 19, wherein said reflecting plate is formed of a metallic material for isolating electro-magnetic interference.

24. The backlight module of claim 19, wherein a metallic material for isolating electro-magnetic interference is coated on a surface of said reflecting plate, a surface of said coupling elements, or the combination thereof.

25. The backlight module of claim 19, wherein said light guiding plate further comprises a plurality of support elements engaging to fix said light generating unit.

* * * * *